June 8, 1926.

T. T. BRAY

HOSE CLAMP

Filed May 29, 1925

1,588,301

T. T. Bray, INVENTOR

BY Victor J. Evans ATTORNEY

WITNESS:

Patented June 8, 1926.

1,588,301

UNITED STATES PATENT OFFICE.

THOMAS T. BRAY, OF DUNCAN, OKLAHOMA, ASSIGNOR OF ONE-HALF TO OSCAR FRENSLEY AND G. F. WOMACK, OF DUNCAN, OKLAHOMA.

HOSE CLAMP.

Application filed May 29, 1925. Serial No. 33,763.

My present invention has reference to a hose coupler.

My object is the provision of a means for attaching a flexible hose to a metal pipe in an easy, expeditious and thoroughly efficient manner.

A further object is to provide a clamp or coupler for this purpose which includes separate but cooperating jaw members designed to be arranged over the hose, each of said jaws having a spring arm which is arched and which terminates in a sleeve having a conical bore for engagement with a conical enlargement on the pipe which has its end received in the hose, a ring holding the arms properly spaced, while a nut, screwed on the pipe, contacts with the outer end of the sleeve for springing the arms against the ring, and by arching said arms forcing the jaws into tight engagement with the hose, the clamping engagement being thus automatic, and the construction being simple and thoroughly efficient.

The drawings illustrate the improvement.

In the drawings:—

Figure 1:
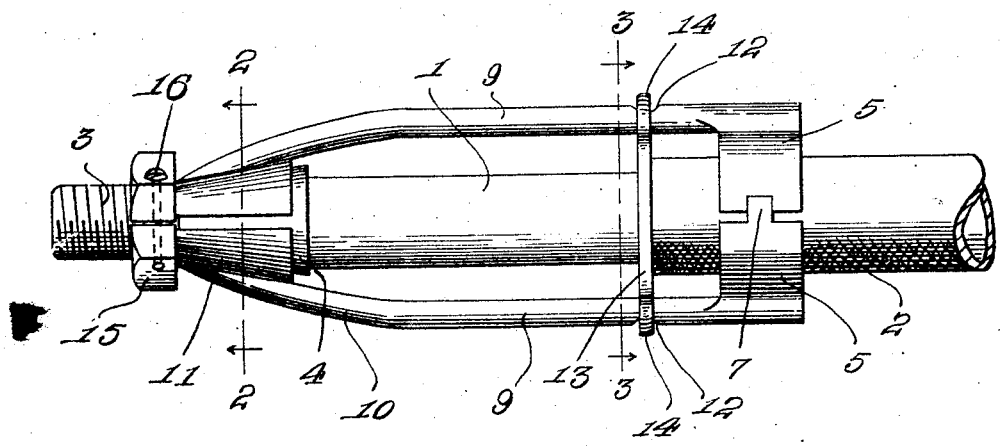
Figure 1 is a view of a hose coupled to a metal pipe in accordance with this invention.
Figure 2:
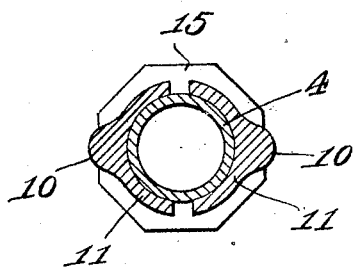
Figure 2 is a section on the line 2—2 of Figure 1.
Figure 3:
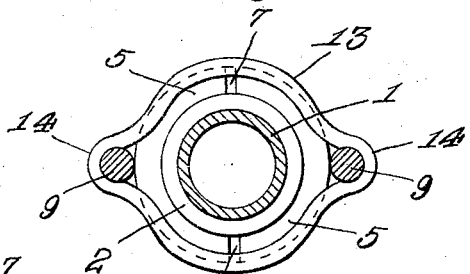
Figure 3 is a sectional view on the line 3—3 of Figure 1.
Figure 4:
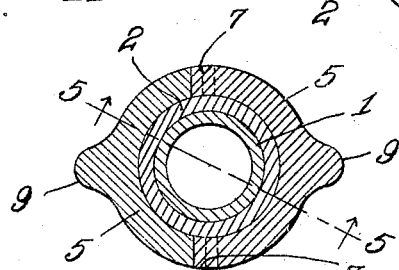
Figure 4 is a transverse sectional view through the jaw members.
Figure 5:
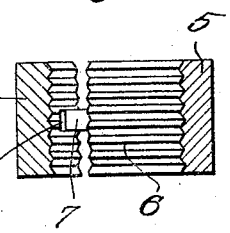
Figure 5 is a sectional view on the line 5—5 of Figure 4.

Referring now to the drawings in detail, the numeral 1 designates a metal pipe that has received over one of its ends, a flexible hose 2. The second end of the pipe is threaded, as at 3, and from the said threads the pipe is formed with a conical enlargement 4. Designed to be arranged over the portion of the hose 2 that receives the pipe 1 therein there are cooperating jaw members. Each jaw comprises a semi-cylindrical member 5 that has its inner bore formed with circumferential teeth 6. The jaws at the confronting ends thereof are provided with interengaging tongues 7 and grooves 8. Integrally formed with the jaws, at the center thereof, there are spring arms 9. These arms have their outer or rear ends arched, as at 10, and connected to the sections 11 of a conical sleeve. The sleeve is also formed with two parts, and the conical bore thereof is designed to be received on the conical enlargement 4 of the pipe 1.

The arms 9, at a suitable distance from their connection with the jaws 5, have their outer edges notched, as at 12. Arranged over the arms there is a ring member 13. The ring, at diametrically opposite points, is bulged outwardly to form the same with eye portions 14 and these eyes are received in the depressions 12 in the arms 9. As far as the description has progressed it will be noted that the ring 13 exerting a pressure upon the spring arms 9 will force the jaws 5 toward each other, and, of course, into biting engagement with the hose 2. However, to positively bind the hose on the pipe 1 I screw on the threaded end of the said pipe a nut 15. This nut is designed to contact with the reduced outer ends of the conical sleeve members 11. The screwing home of the nut will cause the sleeve members to ride on the conical enlargements 4 of the pipe 1, thus bowing the spring arms 9. The ring member 13 serves as a fulcrum for the arms 9 so that when the arms are thus bowed the jaws 5 will be brought closer together to tightly and effectively clamp the hose therebetween and likewise effectively hold the hose on the pipe 1, regardless of any pressure between the pipe and the hose.

I have referred to the arms 9 as spring members as they are constructed of metal and embody a natural resiliency. As a matter-of-fact, the arms may be comparatively rigid but will bow when under pressure, in a manner as above described. Also, in some instances, and especially when the pipe 1 has its end 3 of a determined length, or when the said end 3 is connected to the source of water supply, the nut 15 may be made of two sections, as disclosed in Figure 1 of the drawings, and these cooperating sections may be connected by removable elements in the nature of headless bolts 16.

The simplicity of the invention and the advantages thereof will be perfectly apparent to those skilled in the art to which such invention relates, but it is, of course, to be understood that I do not wish to be restricted to size, proportion or other details of construction and therefore may make such changes therefrom as fairly fall within the scope of what I claim.

Having described the invention, I claim:—

1. Means for coupling a hose to a metal pipe in which the hose is arranged over one end of the pipe, said pipe having its opposite end threaded and being formed with a conical enlargement, substantially U-shaped cooperating jaws arranged to surround the hose, spring arms extending from the jaws and terminating in conical sleeves which are disposed over the conical enlargement of the pipe, means adjacent to the jaws arranged around the arms for holding the latter from outward movement, and a nut adjustable on the threaded end of the pipe for contacting the ends of the sleeve sections to cause the latter to ride on the conical enlargement of the pipe and to bow said arms and to force the jaws into tight engagement with each other.

2. A hose coupler comprising a metal pipe having a hose arranged on one end thereof, said pipe having its opposite end threaded and formed with a conical enlargement from said threads, cooperating substantially semi-cylindrical jaws having their inner faces toothed, interengaging means between the ends of the jaws, a spring arm formed on each of the jaws and terminating each in a sleeve, having a conical bore arranged over the conical enlargement of the pipe, said arms adjacent to their connection with the jaws being notched, a ring member arranged around the arms and having diametrically outbulged portions forming eyes received in the notches, a nut screwed on the threaded end of the pipe for contacting with the sectional sleeves to force the same to ride on the conical enlargement of the pipe to bow the spring arms outwardly and to force the jaws thereon toward each other.

In testimony whereof I affix my signature.

THOMAS T. BRAY.